May 7, 1929.  E. N. BAKER  1,712,065
ELECTRIC MOTOR
Filed July 5, 1927
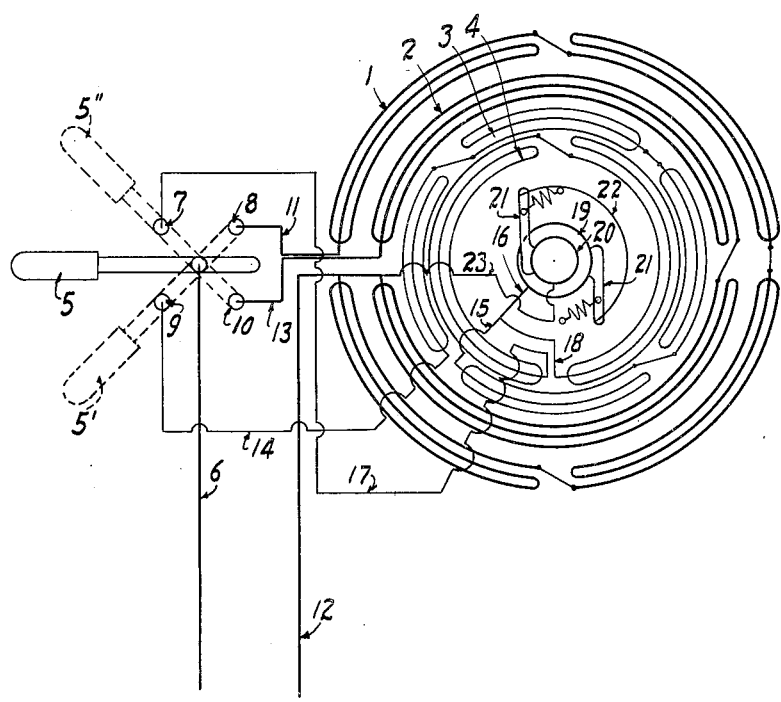
Edgar N. Baker Inventor
By Staley & Welch Attorneys Patented May 7, 1929.

1,712,065

UNITED STATES PATENT OFFICE.

EDGAR N. BAKER, OF SPRINGFIELD, OHIO, ASSIGNOR, BY MESNE ASSIGNMENTS, TO ROBBINS & MYERS, INC., OF SPRINGFIELD, OHIO, A CORPORATION OF OHIO.

ELECTRIC MOTOR.

Application filed July 5, 1927. Serial No. 203,545.

This invention relates to improvements in electric motors, it more particularly relating to a single phase motor adapted to operate at different speeds.

An object of the invention is to provide a motor in which the field windings are arranged for two separate speeds of the motor, together with two separate starting windings, in connection with a single cut-out device for automatically cutting out the energized starting winding when the motor has reached a predetermined speed.

In the accompanying drawing, the figure is a diagrammatic view of the windings of a motor embodying the improvements.

Referring to the drawing, 1 represents a main winding, which in the present case is shown as a four-pole winding, and 2 represents a second main winding, shown in the present case as a two-pole winding. Cooperating with the main winding 1 is a four-pole starting winding 3 and cooperating with the main winding 2 is a two-pole starting winding 4. A main switch is indicated at 5 connected with the main line 6, cooperating with which are four contacts 7, 8, 9 and 10. One end of the main windings 1 is connected with the contact 8 by the lead 11, the other end of said winding being connected to the main line 12. The other main winding 2 has one end connected with the contact 10 by the lead 13, the other end of this main winding 2 being connected with the main line 12. One end of the starting winding 3 is connected with the contact 9 by the lead 14, the other end of this starting winding 3 being connected to line 12 through an automatic cut-out through leads 15 and 16. One end of the starting winding 4 is connected to the contact 7 through the lead 17, the other end of this starting winding being connected to the automatic cut-out through the leads 18 and 16. Lead 16 is connected with one ring 19 of the cut-out, while the other ring 20 is connected with line 12 by lead 23. Centrifugally operated brushes 21 cooperate respectively with the rings and are connected together by wire 22.

The operation is as follows: For low speed, the main switch member 5 is thrown to the position indicated at 5' so as to connect leads 11 and 14 with the main line wire 6 which establishes a circuit through the main winding 1 and through the starting winding 3, this latter circuit, as will be seen, being from main line wire 6 through switch 5, lead 14, winding 3, lead 16, cut-out, and lead 23 to line 12.

For high speed the main switch 5 is thrown to the dotted line position indicated at 5" which connects contacts 7 and 10 with the main line 6. Current then flows through the main winding 2 and the starting winding 4, the circuit through the starting winding 4 being from main line wire 6 through switch 5, lead 17, winding 4, lead 18, automatic cut-out and lead 23 to main line 12.

By this arrangement it will be seen that I am enabled to use a single cut-out switch which will open either starting winding, which thus enables me to use starting windings which operate independently of each other, that is, that are not connected in series, the only method known prior to my invention of controlling the starting windings by a single cutout switch being to connect such windings in series, an arrangement which is undesirable because the magneto-motive force of the unused starting winding distorts the flux wave of the active starting winding and in that way makes the starting less efficient. By my arrangement of providing a means by which a single cut-out switch will act selectively in connection with two independent starting windings and connect the starting winding for each motor speed desired better starting performance is obtained.

Having thus described my invention, I claim:

1. In a motor of the kind described, a plurality of main windings having different speed characteristics, a separate starting winding for each main winding having the same speed characteristic as said main winding, said starting windings being arranged to be separately energized, a single controlling switch for separately energizing each main winding and its companion starting winding, and automatic means for deenergizing the energized starting winding at a predetermined speed, said means being common to all of said starting windings.

2. In a motor of the character described, a plurality of main windings of different numbers of poles, a separate starting winding for each main winding having the same number of poles as said main winding, said starting windings being arranged to be separately energized, a single controlling switch for separately energizing each main winding and its companion starting winding, and automatic means for deenergizing the energizing starting winding at a predetermined speed, said means being common to all of said starting windings.

3. In a motor of the character described, main windings having different speed characteristics, and a separate starting winding of appropriate speed characteristic to co-act with each main winding, connections which energize each starting winding separately in conjunction with its companion main winding, and a single centrifugally-operated cut-out switch to deenergize at a predetermined speed the active starting winding.

In testimony whereof, I have hereunto set my hand this 30th day of June, 1927.

EDGAR N. BAKER.